Sept. 1, 1970 E. A. PELCZARSKI ET AL 3,526,478
GENERATION OF HYDROGEN FROM SULFUR-BEARING CARBONACEOUS FUEL
Filed Nov. 1, 1968 2 Sheets-Sheet 1

INVENTORS
EUGENE A. PELCZARSKI
& JAMES A. KARNAVAS
BY
Dunlap, Laney, Hessin & Dougherty
ATTORNEYS

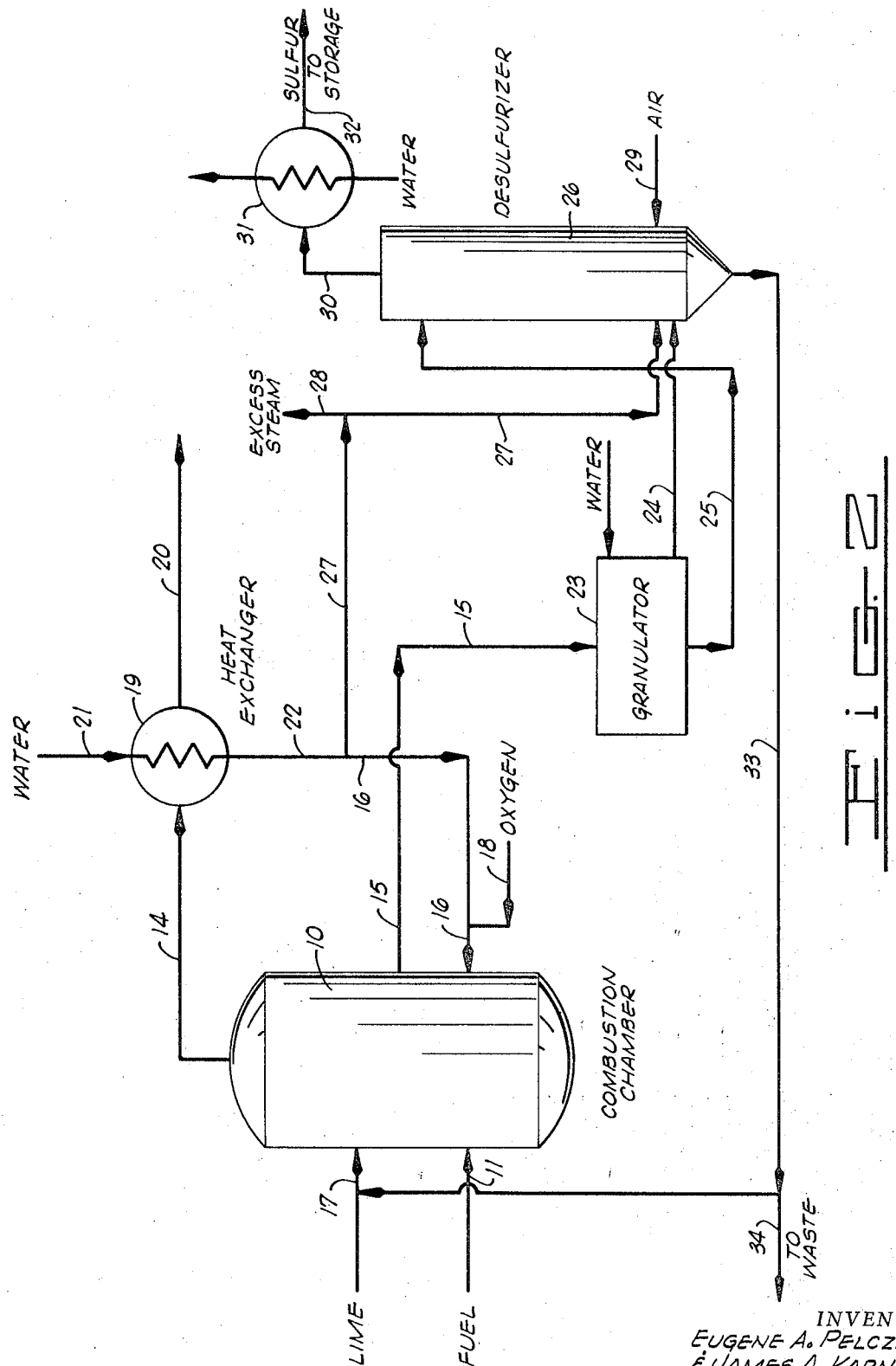

[3,526,478]
GENERATION OF HYDROGEN FROM SULFUR-
BEARING CARBONACEOUS FUEL
Eugene A. Pelczarski, Independence, and James A.
Karnavas, Kansas City, Mo., assignors to Black, Sivalls
& Bryson, Inc., Kansas City, Mo., a corporation of
Delaware
Continuation-in-part of application Ser. No. 717,851,
Apr. 1, 1968. This application Nov. 1, 1968, Ser.
No. 772,791
Int. Cl. C01b *1/02;* C01f *11/00*
U.S. Cl. 23—212                                   11 Claims

ABSTRACT OF THE DISCLOSURE

A process for the generation of hydrogen from sulfur-bearing fuel whereby relatively pure sulfur free hydrogen is generated. The sulfur-bearing carbonaceous fuel may be coal, pyritic refuse from coal mining, or other low heat content sulfur-bearing carbonaceous fuels such as lignite and certain types of peat. By the present invention sulfur is removed from the fuel and recovered economically in the form of elemental sulfur.

CROSS REFERENCE TO RELATED APPLICATION

This application is a continuation-in-part of our pending application, Ser. No. 717,851 filed Apr. 1, 1968.

BACKGROUND OF THE INVENTION

The present invention relates to a process for the generation of hydrogen from solid sulfur-bearing carbonaceous fuel. The gasification of solid carbonaceous fuel by reaction with a limited quantity of oxygen to produce carbon monoxide is well known. Also, the generation of hydrogen by shift conversion of the carbon monoxide produced has heretofore been carried out in a variety of processes. A problem common to all these processes arises when the fuel used contains sulfur. When sulfur-bearing fuels are combusted and gasified by reaction with oxygen, sulfur containing gases, usually predominantly sulfur dioxide, are produced in addition to the other products of combustion. Such sulfur containing gases are objectionable in that they corrode equipment, poison catalysts in catalytic reactors or pollute the atmosphere as a part of a waste stream.

Prior to the present invention many attempts have been made to remove sulfur from the sulfur-bearing fuel prior to combustion of the fuel with oxygen. While some of these attempts have been comparatively successful in removing the sulfur, they have proven to be economically unattractive for commercial use because of high investment and operating costs. In addition, processes have been developed to remove the sulfur containing gases after the fuel has been combusted and gasified. However, these processes also generally require very expensive equipment or high operating costs, or both, to carry out.

The present invention provides a process for the generation of hydrogen from solid sulfur-bearing carbonaceous fuel whereby the sulfur is economically removed during the combustion step so that essentially no sulfur containing gases are produced with the hydrogen. In addition, the present invention provides a process for converting the sulfur removed from the carbonaceous fuel to recoverable elemental sulfur.

SUMMARY OF THE INVENTION

The present invention is directed to a process for the generation of hydrogen from solid sulfur-bearing fuel wherein the fuel is injected into a molten iron bath beneath the surface of the bath and reacted with oxygen and steam to form hydrogen and other gases. Lime is introduced on the surface of said iron bath so that calcium sulfide is formed. The calcium sulfide is removed from said iron bath and either discarded or processed further for the recovery of elemental sulfur. The hydrogen and other gases are removed from said molten iron bath and then the hydrogen is separated from the other gases to obtain a pure hydrogen stream.

It is, therefore, an object of the present invention to provide a process for the generation of hydrogen from sulfur-bearing carbonaceous fuels.

A further object of the present invention is the provision of a process for the generation of hydrogen from solid sulfur-bearing carbonaceous fuels wherein sulfur is removed from the fuel during the combustion step thereby preventing sulfur containing gases from being produced with the hydrogen.

It is still a further object of the present invention to provide a process for the combustion of solid sulfur-bearing fuel wherein the sulfur removed from the fuel is economically recovered in the form of elemental sulfur.

Other and further objects, features, and advantages will be apparent from the following description of presently preferred embodiments of the invention, given for the purpose of disclosure, and taken in conjunction with the accompanying drawings.

DESCRIPTION OF THE DRAWINGS

In the drawings forming a part of the disclosure herein, like character references designate like parts throughout the several views wherein:

FIG. 2 is a diagrammatic view of one form of the process of the present invention.

DESCRIPTION OF THE PREFERRED EMBODIMENT

Figure 1:
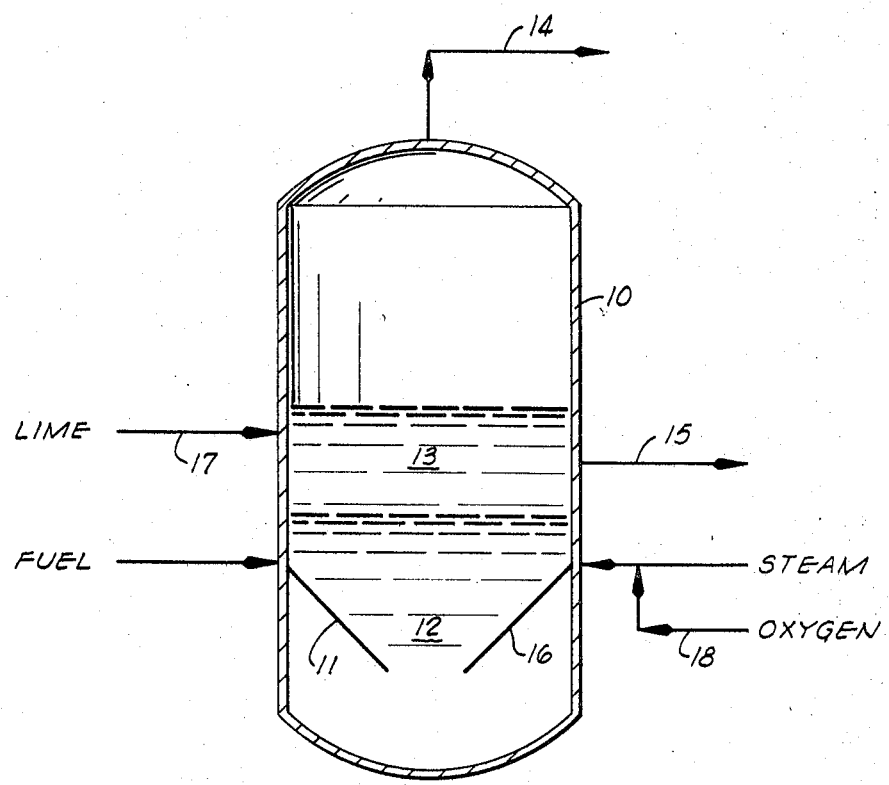
FIG. 1 is a diagrammatic view of the combustion vessel of the present invention.

Referring now to the drawings, and particularly to FIG. 1, combustion vessel 10 contains a molten iron bath 12. Crushed solid sulfur-bearing carbonaceous fuel, which may be coal, pyritic refuse, or other low heat content sulfur-bearing fuel such as lignite and certain types of peat, is introduced in the lower portion of iron bath 12 through line 11 which may be a water-cooled lance or other similar device. Most of such fuels contain ash or an incombustable residue which accumulates on the surface of the molten iron bath in the form of slag. Lime is injected into vessel 10 above iron bath 12 so that a molten layer of lime bearing slag 13 accumulates on the surface of iron bath 12. Lime is used herein to mean calcium oxide or calcium carbonate (limestone) or dolomite, a mixture of calcium and manganese carbonate or oxide. Calcium carbonate will be converted to calcium oxide at the temperature level within vessel 10.

The molten layer of lime-bearing slag is maintained on the surface of the molten iron bath to serve two purposes—first, it functions as a fluxing agent for the ash, i.e., the mixture of incombustible residue from the fuel is rendered into a fluid state, and, second, it causes the sulfur absorbed by the molten iron bath to be desorbed and to react with the lime to form calcium sulfide. Thus, by the present invention, lime is added to the layer of slag on the surface of the molten iron bath and a portion of the slag is continuously withdrawn thereby continuously desorbing and removing sulfur from the iron bath.

Steam and oxygen are injected into iron bath 12 through lance 16. Upon contact with the molten iron, carbon from the fuel is absorbed by the iron bath. The carbon preferentially reacts with oxygen and steam to form hydrogen and other gases. Depending on the temperature of the molten iron bath, which controls the shift equilibrium of the reaction within the iron bath, quantities of carbon dioxide and water vapor will alos be generated in addition to the hydrogen. These reactions may be written as follows:

$$2C + O_2 \rightarrow 2CO$$
$$C + H_2O \rightarrow CO + H_2$$
$$CO + H_2O \rightarrow H_2 + CO_2$$

Sulfur entering the iron bath with the carbonaceous fuel is absorbed by the iron bath and is prevented from reacting with oxygen by the presence of more chemically active carbon. The carbon content of the molten iron bath must be maintained at a high enough level to insure the sulfur has no chance of reacting with oxygen to form sulfur dioxide. This is easily accomplished by controlling the carbonaceous fuel in put relative to the oxygen input so that the proper level of carbon remains in the iron bath at all times.

Because the reaction of steam with the carbon from the fuel is endothermic, the volume of steam injected may be used to control the temperature of the molten iron bath. The hydrogen, carbon monoxide, carbon dioxide and water vapor formed in the reaction within the iron bath pass upwardly through the iron bath, through slag layer 13 and out of vessel 10 through conduit 14.

Ash consisting of incombustibles from the fuel rises to the top of iron bath 12 and is fluxed or rendered into a fluid state by lime thereby forming lime-bearing slag layer 13. Slag layer 13 also functions as a desorbing agent for the sulfur absorbed by the molten iron bath 12. As the sulfur is desorbed from iron bath 12 it reacts with a portion of the lime contained therein to form calcium sulfide. A portion of slag layer 13 is continuously removed from vessel 10 through a runner or conduit 15. At the same time additional lime is continuously injected into vessel 10 through line 17. Thus sulfupr is continuously desorbed and removed from iron bath 12 in the form of calcium sulfide. The removed slag also contains ash and lime.

Referring now to FIG. 2, the stream of hydrogen and other gases removed from vessel 10 through conduit 14 are conducted to heat exchanger 19. Heat exchanger 19 may be any commercial heat exchanger wherein heat is exchanged from one medium to another. In the present embodiment of the invention water is used as a cooling medium and heat exchanger 19 is designed so that the heat removed from the gas stream vaporizes the water producing steam. The thus cooled gas stream leaves heat exchanger 19 through conduit 20 from where it may be conducted to a purification and separation process for obtaining hydrogen. The purification process may include the steps of dehydration, absorption, and cryogenic fractionation to produce a pure hydrogen stream. This type of process is well known in the art and no further description of it is given herein.

Liquid water enters heat exchanger 19 through conduit 21 where heat is transferred to it from the gas stream being cooled. Steam generated from the water leaves heat exchanger 19 through conduit 22 and is divided into two portions, the first portion entering conduit 16 from where it is conducted to combustion vessel 10 and the second portion entering conduit 27.

The molten slag removed from combustion vessel 10 through runner 15 is conducted to a granulator 23 where it is converted into a granular solid form. Commercial slag granulating devices are available which cool the slag enough to solidify it and at the same time granulate it. These devices may incorporate a spinning disc, water jet, or other means for cooling and granulating the slag. In the present invention a water jet-type of granulator is preferred. No further detailed description of granulator 23 is given since a commercially available unit may be used.

When contacted with water in granulator 23 some of the calcium sulfide contained in the molten slag stream reacts with the water to form hydrogen sulfide and lime. Also a portion of the water is vaporized due to the heat transferred out of the slag and into the water. The hydrogen sulfide vapor and steam thus formed are removed from granulator 23 through conduit 24. The hydrogen sulfide vapor and water travel through conduit 24 into desulfurizer 26.

Hot granular solid slag is transferred from granulator 23 through conduit 25 to desulfurizer 26. The second portion of steam from conduit 22 enters conduit 27 which conducts it to the bottom portion of desulfurizer 26. Any excess steam not used in the process of the present invention is removed from conduit 27 by conduit 28 from where it may be conducted to other areas for further use or vented to the atmosphere.

The granulated slag entering desulfurizer 26 travels downwardly and is intimately contacted by steam entering desulfurizer 26 through conduit 27 and air which is injected into desulfurizer 26 through conduit 29. Desulfurizer 26 contains baffles or other similar means for bringing about intimate contact between the slag steam and air. In desulfurizer 26 steam reacts with the calcium sulfide contained in the slag to form hydrogen sulfide. The hydrogen sulfide thus formed reacts with oxygen to form sulfur dioxide which in turn reacts with additional hydrogen sulfide to form elemental sulfur vapor. These reactions may be written as follows:

$$CaS + 2H_2O \rightarrow H_2S + Ca(OH)_2$$
$$3H_2S + 1\tfrac{1}{2}O_2 \rightarrow SO_2 + 2H_2S + H_2O$$
$$2H_2S + SO_2 \rightarrow 3S + 2H_2O$$

It should be noted that the constituents in the slag will catalyze the reaction between the hydrogen sulfide and sulfur dioxide to form elemental sulfur vapor. However, it may be necessary to add additional catalysts depending upon the exact composition of the slag.

If preferred, the granulated slag may be wetted and contacted with carbon dioxide to form hydrogen sulfide. This reaction may be written as follows:

$$CaS + CO_2 + H_2O \rightarrow CaCO_3 + H_2S$$

The hydrogen sulfide can then be converted to elemental sulfur in a conventional Clause process which is well known in the art.

The sulfur vapor thus formed passes upwardly within desulfurizer 26 into conduit 30 from where it enters heat exchanger 31. Heat exchanger 31 may be any conventional heat exchanger which will bring about cooling and condensation of the sulfur vapor. The condensed sulfur is then removed from heat exchanger 31 through conduit 32 from where it is conducted to storage.

The reacted slag accumulating in the bottom portion of desulfurizer 26 contains unreacted calcium oxide, calcium hydroxide, ash and other compounds. This spent slag is conveyed out of desulfurizer 26 through conveyor 33 and a portion of it is recycled to combustion vessel 10 where it is again deposited on the surface of the molten iron bath contained within combustion vessel 10. A portion of the spent slag is conveyed to a waste pile through conveyor 34. It is necessary to continuously transfer a portion of the spent slag to waste in order to prevent a high build up of ash in the process.

It should be noted that in the initial startup of the present invention it is necessary to introduce sufficient iron into combustion vessel 10 to form molten iron layer 12, and then to introduce sufficient fresh lime to maintain a continuous cycle of slag in the process.

What is claimed is:

1. A process for the generation of hydrogen from solid sulfur-bearing carbonaceous fuel which comprises:
    reacting said fuel with oxygen and steam beneath the surface of a molten iron bath to form hydrogen and other gases;
    introducing lime on the surface of said molten iron bath so that sulfur from said fuel reacts with said lime to form calcium sulfide;
    removing said hydrogen and other gases from said molten iron bath;
    removing said calcium sulfide from said molten iron bath; and
    separating said hydrogen from said other gases.

2. The process as set forth in claim 1 including the additional step of recovering elemental sulfur from said calcium sulfide.

3. A process for the generation of hydrogen from solid sulfur-bearing carbonaceous fuel which comprises:
    reacting said fuel with oxygen and steam beneath the surface of a molten iron bath to form hydrogen and other gases;
    introducing lime on the surface of said molten iron bath so that sulfur from said fuel reacts with said lime to form calcium sulfide;
    removing said hydrogen and other gases from said molten iron bath;
    removing said calcium from said molten iron bath;
    cooling said removed hydrogen and other gases with water so that steam is generated from said water for reaction with said fuel beneath the surface of said molten iron bath;
    separating said hydrogen from said other gases.

4. The process as set forth in claim 3 including the additional step of:
    recovering elemental sulfur from said removed calcium sulfide.

5. A process for the generation of hydrogen from solid sulfur-bearing carbonaceous fuel containing ash which comprises:
    introducing said fuel into a combustion vessel beneath the surface of a molten iron bath contained therein so that carbon and sulfur in said fuel are absorbed by said iron bath;
    reacting said absorbed carbon with oxygen and steam in said combustion vessel to form hydrogen and other gases;
    simultaneously introducing lime on the surface of said molten iron bath so that sulfur is desorbed from the iron bath and reacted with said lime to form calcium sulfide and so that a molten layer of slag is formed from ash and lime on the surface of said molten iron bath;
    removing said hydrogen and other gases from said combustion vessel;
    continuously removing portions of said layer of slag and calcium sulfide from the surface of said molten iron bath; and
    separating said hydrogen from said other gases.

6. The process as set forth in claim 5 including the additional step of recovering elemental sulfur from said removed layer of slag and calcium sulfide to form spent slag.

7. The process as set forth in claim 6 including the additional step of recycling a portion of said spent slag to the surface of said molten iron bath.

8. A process for the generation of hydrogen from solid sulfur-bearing carbonaceous fuel containing ash which comprises:
    introducing said fuel into a combustion vessel beneath the surface of a molten iron bath contained therein so that carbon and sulfur in said fuel are absorbed by said iron bath;
    reacting said absorbed carbon with oxygen and steam in said combustion vessel to form hydrogen and other gases;
    simultaneously introducing lime on the surface of said molten iron bath so that sulfur is desorbed from the iron bath and reacted with said lime to form calcium sulfide and so that a molten layer of slag is formed from ash and lime on the surface of said molten iron bath;
    removing said hydrogen and other gases from said combustion vessel;
    continuously removing portions of said molten layer of slag and calcium sulfide from the surface of said molten iron bath;
    granulating said removed portions of said slag and calcium sulfide;
    reacting said granulated slag and calcium sulfide with steam and air in a desulfurizer vessel to form elemental sulfur vapor and spent slag;
    removing said elemental sulfur vapor from said desulfurizer vessel;
    removing said spent slag from said desulfurizer vessel; and
    separating said hydrogen from said other gases.

9. The process as set forth in claim 8 including the additional step of recycling a portion of said spent slag to the surface of said molten iron bath.

10. A process for the generation of hydrogen from solid sulfur-bearing carbonaceous fuel containing ash which comprises:
    introducing said fuel into a combustion vessel beneath the surface of a molten iron bath contained therein so that carbon and sulfur in said fuel are absorbed by said iron bath;
    reacting said absorbed carbon with oxygen and steam in said combustion vessel to form hydrogen and other gases;
    simultaneously introducing lime on the surface of said molten iron bath so that sulfur is desorbed from the iron bath and reacted with said lime to form calcium sulfide and so that a molten layer of slag is formed from ash and lime on the surface of said molten iron bath;
    removing said hydrogen and other gases from said combustion vessel;
    continuously removing portions of said molten layer of slag and calcium sulfide from the surface of said molten iron bath;
    granulating said removed portions of said layer of slag and calcium sulfide;
    reacting said granulated slag and calcium sulfide with steam and air in a desulfurizer vessel to form elemental sulfur vapor and spent slag;
    removing said elemental sulfur vapor from said desulfurizer vessel;
    removing said spent slag from said desulfurizer vessel;
    cooling said removed hydrogen and other gases with water so that steam is generated from said water for reaction beneath the surface of said molten iron bath in said combustion vessel and for reaction in said desulfurizer vessel; and
    separating said hydrogen from said other gases.

11. The process as set forth in claim 10 including the additional step of recycling a portion of said spent slag to the surface of said molten iron bath.

References Cited

UNITED STATES PATENTS

| | | | |
|---|---|---|---|
| 1,592,860 | 7/1926 | Leonarz | 23—204 |
| 2,270,897 | 1/1942 | Roberts et al. | 23—212 XR |
| 2,824,047 | 2/1958 | Gorin et al. | 201—17 XR |
| 2,830,883 | 4/1958 | Eastman | 23—204 XR |
| 2,953,443 | 9/1960 | Rummel | 48—92 XR |
| 3,074,783 | 1/1963 | Paull | 23—212 |
| 3,115,394 | 12/1963 | Gorin et al. | 23—212 |
| 3,188,179 | 6/1965 | Gorin | 23—212 |
| 3,382,044 | 5/1968 | Cromeans | 23—212 |
| 3,402,998 | 9/1968 | Squires | 23—181 |

FOREIGN PATENTS 226,500  8/1925  Great Britain.

EDWARD STERN, Primary Examiner

U.S. Cl. X.R.

23—134, 181, 224, 225